US009089866B2

(12) United States Patent
Schultheis

(10) Patent No.: US 9,089,866 B2
(45) Date of Patent: Jul. 28, 2015

(54) SPRINKLER WITH VERTICAL OSCILLATION

(76) Inventor: Stephen Schultheis, Laguna Hills, CA (US)

( * ) Notice: Subject to any disclaimer, the term of this patent is extended or adjusted under 35 U.S.C. 154(b) by 0 days.

(21) Appl. No.: 13/233,957

(22) Filed: Sep. 15, 2011

(65) Prior Publication Data

US 2013/0068848 A1 Mar. 21, 2013

(51) Int. Cl.
*B05B 15/10* (2006.01)
*A01G 25/06* (2006.01)
*B05B 3/04* (2006.01)

(52) U.S. Cl.
CPC ............... *B05B 15/10* (2013.01); *B05B 3/0445* (2013.01)

(58) Field of Classification Search
CPC ........ B05B 15/10; B05B 1/304; B05B 1/262; B05B 3/16; B05B 3/0445; A01G 25/06; A01G 25/02
USPC .......... 239/203, 242, 204, 205, 206, 240, 241
See application file for complete search history.

(56) References Cited

U.S. PATENT DOCUMENTS 599,846 A * 3/1898 Judge ............................ 239/242
1,796,942 A * 3/1931 Pottenger, Jr. ................ 239/236
1,938,838 A 12/1933 Jacobson
1,962,308 A 6/1934 Jacobson
2,453,368 A * 11/1948 Goodwin ...................... 239/265
2,475,537 A 7/1949 Ashworth
3,272,437 A 9/1966 Coson
3,428,256 A 2/1969 Painter
3,871,582 A 3/1975 Biddle
4,474,328 A 10/1984 Hale
4,480,793 A 11/1984 Grande
5,377,914 A * 1/1995 Christen ....................... 239/252
5,704,549 A 1/1998 Kephart et al.
5,720,435 A * 2/1998 Hunter .......................... 239/204
5,730,366 A 3/1998 DeWitt
6,095,432 A * 8/2000 Casagrande .................. 239/230
6,502,764 B2 1/2003 Walker
2010/0270398 A1 10/2010 Wang
2011/0284658 A1* 11/2011 Chang ........................... 239/201

OTHER PUBLICATIONS

Boston University School of Public Health, The Normal Distribution: A Probability Model for a Continuous Outcome, Date last modified: May 12, 2013, http://sph.bu.edu/otlt/MPH-Modules/BS/BS704_Probability/BS704_Probability8.html.*

* cited by examiner

*Primary Examiner* — Dinh Q Nguyen
*Assistant Examiner* — Chee-Chong Lee
(74) *Attorney, Agent, or Firm* — Hackler Daghighian & Martino

(57) ABSTRACT

Improved sprinkler apparatus for distributing water from a pressurized water supply line via a sprinkler case connected to the pressurized water supply line, the apparatus includes a spray head and nozzle pivotably mounted in the sprinkler case for distributing water in a vertical plane, and a hydraulic motor disposed within the sprinkler case for causing the spray head to oscillate in the vertical plane.

10 Claims, 5 Drawing Sheets

TOP VIEW OF CAM PLATE (45)

SPRINKLER WITH VERTICAL OSCILLATION

The present invention generally relates to irrigation systems and is more particularly directed to an improved irrigation sprinkler with uniform water distribution and coverage.

Prior art sprinklers, including rotary pop-up sprinklers have many disadvantages. One of the disadvantages includes the lack of uniform disbursement of water regardless of the radial length of the area being sprinkled at any given instant by the nozzle.

Current pop-up sprinkler design incorporate a water turbine to rotatably drive a sprinkler head mechanism with many of these designs also incorporating a means of adjusting the horizontal spray angle of the head. Such current designs also provide for a range of water spraying between 12 to 15 feet or 19 to 32 feet, or a similar range.

The present invention includes a sprinkler design which improves water distribution and coverage by providing a vertical oscillation feature. This feature allows water distribution very similar to hand watering motion. In fact, it can be shown that in particular installations, this vertical motion also allows for nearly complete coverage by a single sprinkler head within a given lawn area and thus largely avoids the need for overlapping sprinkler head installation. This, of course, provides for reduce costs in both installation and operation of an irrigation system.

SUMMARY OF THE INVENTION

Improved sprinkler apparatus, in accordance with the present invention, for distributing water from a pressurized water supply generally includes a spray head which is pivotably mounted in a sprinkler case for distributing water in a vertical plane along with a hydraulic motor disposed within the sprinkler case for causing the spray head to oscillate in a vertical plane. More particularly, the spray head may be movable within the sprinkler case between a retracted position and an extended position.

The hydraulic motor may comprise a gear reduction mechanism to drive a low-speed cam system and connecting rod for causing vertical oscillation of the spray nozzle. In one configuration, the hydraulic motor is configured for oscillating the spray head through an angle of about 60°. A pop-up riser may be utilized for enabling movement of the spray head between a retracted (inoperative) position and an extended (popped-up) position.

BRIEF DESCRIPTION OF THE DRAWINGS

The advantages and features of the present invention will be better understood by the following description when considered in conjunction with the accompanying drawings, in which.

DETAILED DESCRIPTION

Figure 1:
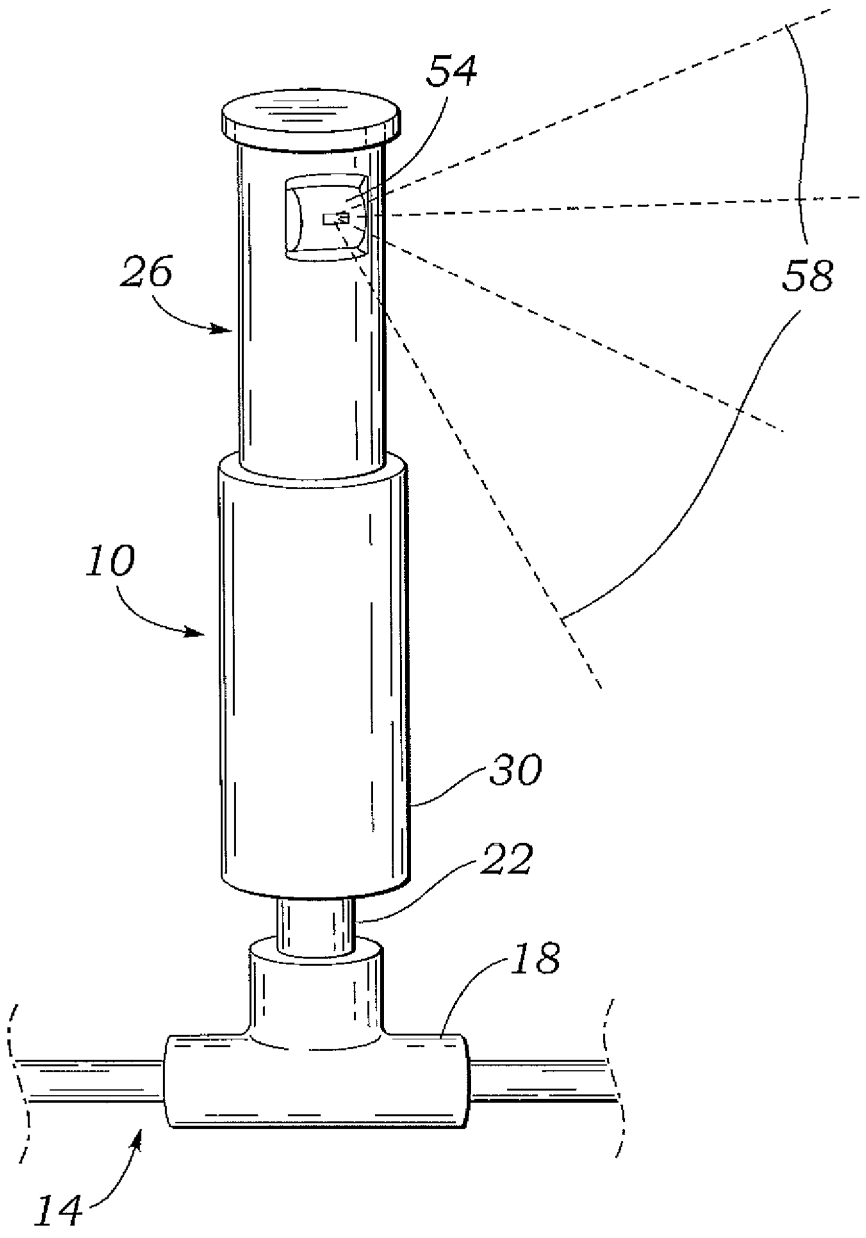
FIG. 1 is a perspective view of sprinkler apparatus in accordance with the present invention as it may be attached to an underground water supply line for distributing water in a vertical plane.
Figure 2:
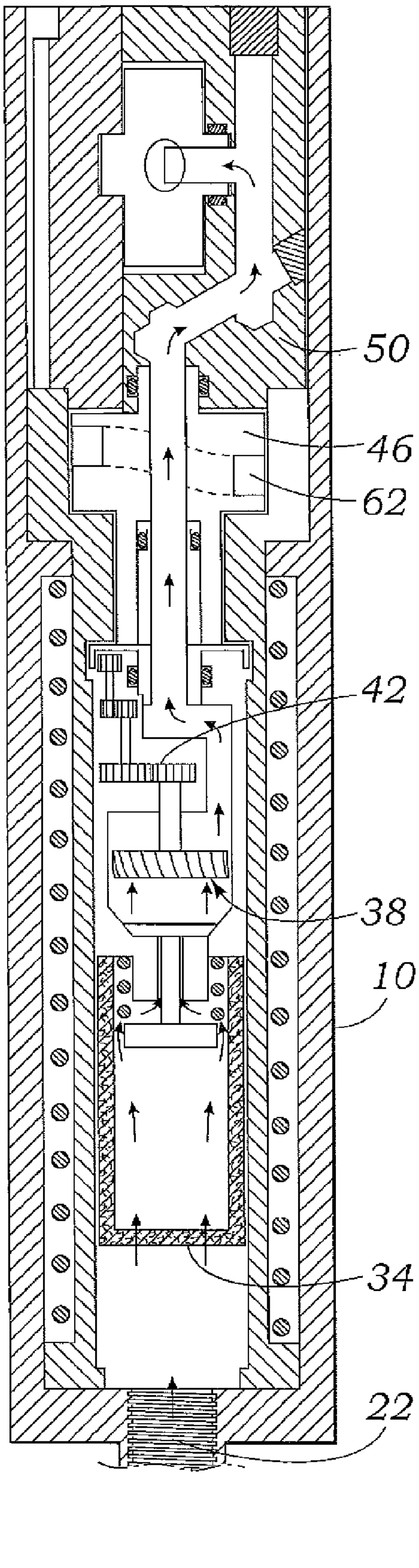
FIG. 2 is a cross sectional view of the apparatus shown in FIG. 1 generally showing a spray head, riser and riser case along with a hydraulic motor for causing the spray head to oscillate in a vertical plane.

With reference to FIGS. 1 and 2, there is shown improved sprinkler apparatus 10 as it may be connected to a water supply 14 by way of a T coupling 18 and stub 22 in a conventional manner. The apparatus 10 includes a pop-up riser 26 slidably disposed within a riser case 30, see also FIG. 2.

In operation, water passes through a filter screen 34 and past a turbine wheel 38 in order to provide high speed rotation thereof. A hydraulic motor 40 causes a spray head 54 to oscillate in a vertical plane as herewith described and calculated.

A gear set 42 provides for slower rotation of a cam plate 46. A spray head 54, when disposed in an extended position as shown in FIG. 1 enables the distribution of water through the spray head 54 and nozzle 55 in a vertical plane through an angle of approximately 60 degrees, as illustrated by dashed lines 58 shown in FIG. 1.

Figure 3:
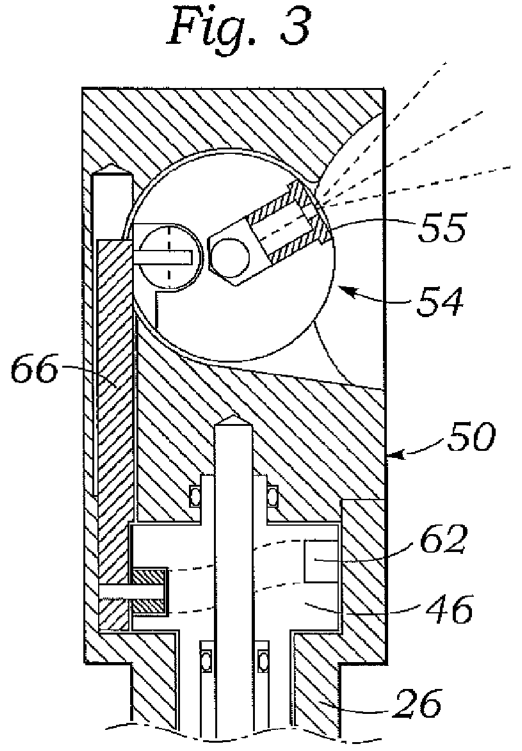
FIG. 3 is a cross sectional view of an upper portion of the assembly shown in FIG. 2 illustrating a cam plate, cam track, and connecting rod for causing oscillation of the spray head in the vertical plane.

With reference again to FIGS. 2 and 3, the cam plate 46 includes a cam track 62 which engages a connecting rod 66, as best shown in FIG. 3. As also shown in FIG. 3, the cam track 62 is at a "low point" causing the spray nozzle 55 to spray water at a maximum distance.

As the cam plate 46 is rotated, the cam track 62 lifts the connecting rod 66 to cause the spray head and spray nozzle 55 to rotate downward, thus spraying water to a minimum distance nearest to the sprinkler apparatus 10.

Calculations show that the cam driven vertical oscillation sprinkler apparatus 10 can be designed to deliver a constant volume of water per square foot of watered surface. This control is provided by the unique cam track design and resulted accurate water distribution. Therefore, uniform water distribution can be provided with less water and overwatering to compensate for dry areas is eliminated.

With reference now to FIGS. 1-9,

Cam Track Design: 90° (Corner) Spray

Assumptions:

Water flow rate is constant=Q

Spray head is 4" above ground

Spray angle is +30° to −30°

Figure 4:
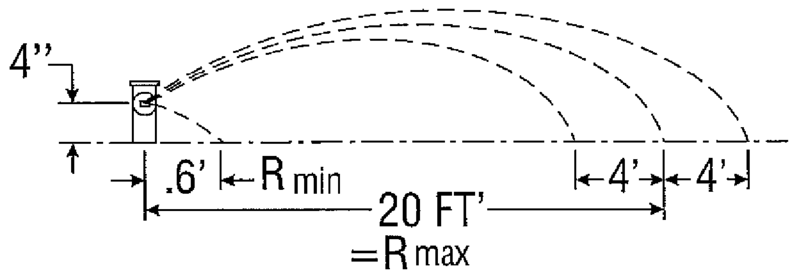
FIGS. 4-9 illustrate calculations for the design of a cam track for providing vertical oscillation of the spray head in accordance with the present invention.
Figure 5:
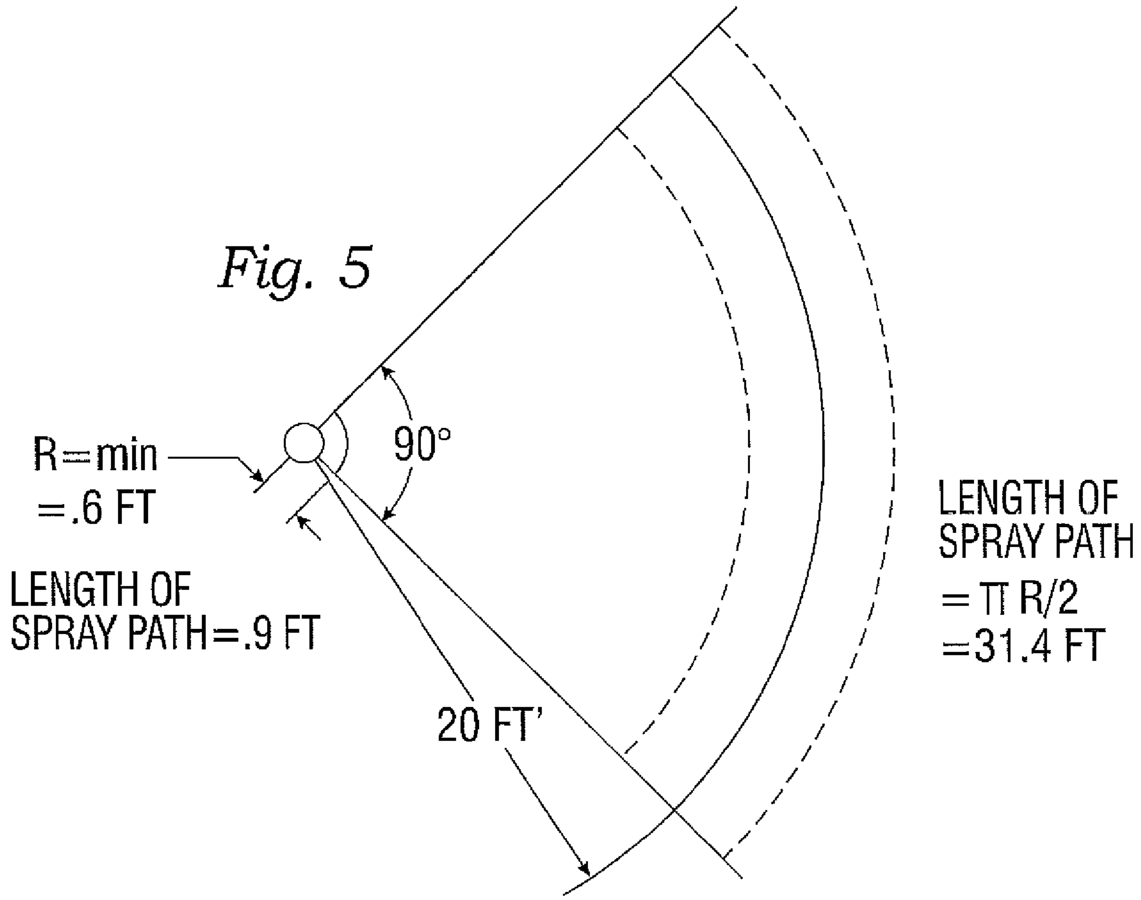
Figure 6:
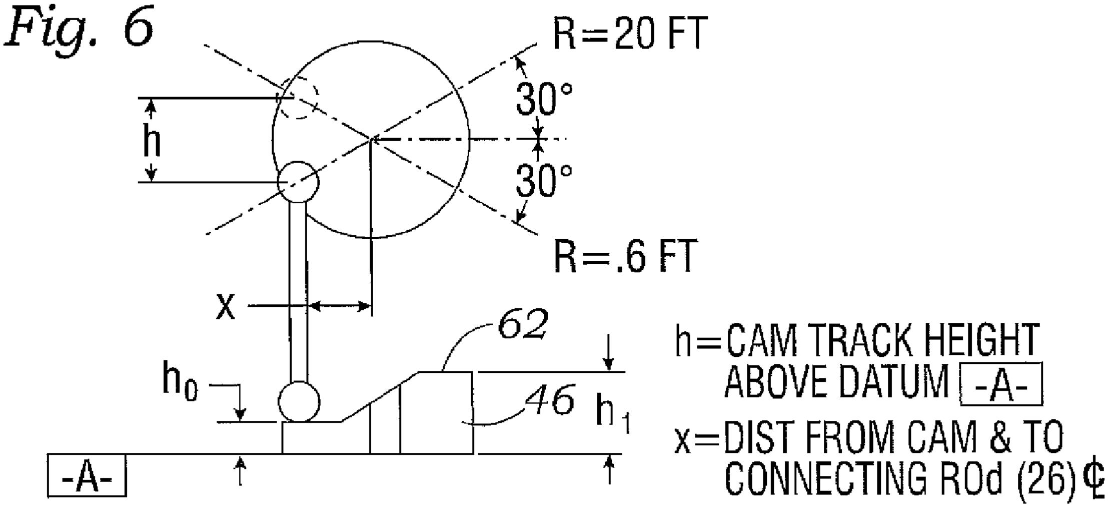
Figure 7:
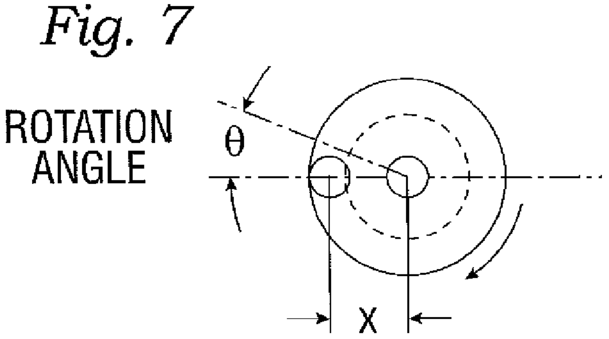

Average spray distance is 20 ft. with ±4 ft. distribution (See FIGS. 4-5)

One revolution of the cam (46) will cause the nozzle (55) to make one vertical oscillation cycle.

To have equal volume of water per unit average of irrigation, the following must be true:

$$\frac{Qt}{\pi R/2} = \text{Constant}$$

Q=Volume flow (ft$^3$/sec)

t=Time (sec)

R=Avg. spray radius

Thus, the amount of time the spray is at a given radius, R, is directly proportional to that radius.

$$t=\pi R/2Q$$

The cam track (62) must be designated to rotate the nozzle (55) in a manner to achieve the above. In the preferred embodiment, the relationship between these is: (See FIG. 6)

For a given cam design, $$h_1 - h_0 = 2\ \text{Tan}\ 30°(x)$$

Since spray radius R is α spray angle, then R α h and must be constant.

$$\therefore \text{th} = \frac{\text{R}\alpha\ {}^{1}/_{h}}{\text{Constant}} \quad \text{(See FIG. 7)}$$

Figure 8:
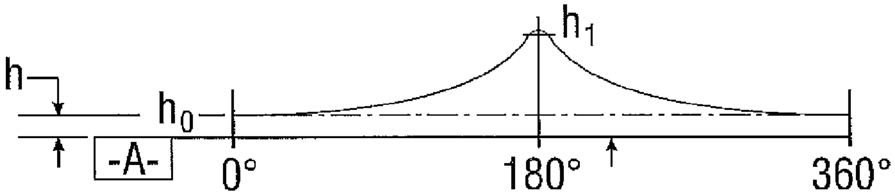

Cam plate 46 rotates through 360°. For a given angle θ, the cam track height (h) above $h_0$ is illustrated in FIG. 8.

Since the cam plate rotates at constant rate, time (t) α rotation angle (θ) $\therefore \theta h$=constant Cam Design

EXAMPLE

4" Pop-Up x=0.4"
h=0.462"@180° cam
assume w=360°/min
Total cycle time=30 sec (180°)

| Head Angle | Spray Distance | Arc Length | Time Interval | % Total | Water Vol./Avg. |
|---|---|---|---|---|---|
| +30° | 20 ft. | 31 ft. | 5 sec. | 27% | 5Q/31 = .16Q |
| +20° | 16.8 ft. | 26.4 ft. | 4.25 sec. | 23% | .16Q |
| +10° | 13.5 ft. | 21.2 ft. | 3.4 sec. | 18.8% | .16Q |
| +0° | 10 ft. | 15.7 ft. | 2.5 sec. | 13.8% | .16Q |
| −10° | 7.2 ft. | 11.3 ft. | 1.8 sec. | 9.9% | .16Q |
| −20° | 3.83 ft. | 6.0 ft. | 1 sec. | 5.5% | .16Q |
| −30° | 0.6 ft. | .94 ft. | .15 sec. | .8% | .16Q |
| | | | | 18.1 sec. | |

Use 0.26Q for 30 sec. cam.
Example of cam track design to deliver a constant amount of water per sq. ft. of irrigated flat surface.

| Head Angle | Spray Dist. | Water Arc Length | % Cam Time | Degrees Rotation (½ Cycle) | Cam "Lift" h |
|---|---|---|---|---|---|
| +30° | 20 ft. | 31 ft. | 27% | 48° | 0 |
| +20° | 16.8 ft. | 26.4 ft. | 23% | 41° | x(Tan 30° − Tan 20) |
| +10° | 13.5 ft. | 21.2 ft. | 18.8% | 34° | x(Tan 30° − Tan 10) |
| +0° | 10 ft. | 15.7 ft. | 13.8% | 25° | X Tan 30° |
| −10° | 7.2 ft. | 11.3 ft. | 9.9% | 18° | X(Tan 30° + Tan 10) |
| −20° | 3.83 ft. | 6.0 ft. | 5.5% | 10° | X(Tan 30 + Tan 20) |
| −30° | 0.6 ft. | .94 ft. | 0.8% | 4° | 2x Tan 30 |
| | | | | 180° | |

Figure 9:
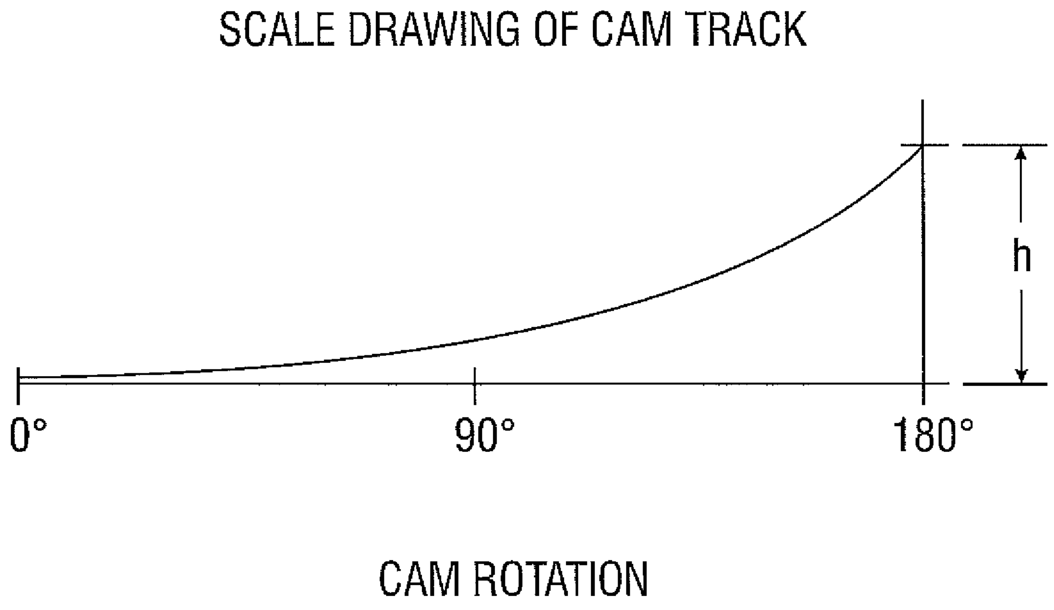

A scale drawing of this case track is shown in FIG. 9.

Although there has been hereinabove described a specific pop-up sprinkler with vertical oscillation in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. An improved sprinkler apparatus for distributing water from a pressurized water supply line, the apparatus comprising:

a spray head and nozzle pivotably mounted about a horizontal axis in a pop-up riser, the spray head and nozzle distributing water in a horizontal plane, the pop-up riser slidably disposed along a vertical axis within a riser case, where the pop-up riser is configured to be in an extended position at least partially above the riser case when pressurized water is flowing through the spray head and nozzle and in a retracted position when pressurized water is not flowing through the spray head and nozzle;

a hydraulic motor comprising a hydraulic driven turbine wheel and a gear set disposed within the pop-up riser configured to oscillate the spray head and nozzle in a vertical plane about the horizontal axis; and a rotating cam mechanism disposed within the pop-up riser and coupled between the spray head and the hydraulic motor controlling the oscillation in the vertical plane about the horizontal axis of the spray head and nozzle, wherein the cam mechanism consists of a rotating cam plate having a rotating cam track disposed in an outer circumferential surface of the rotating cam plate, where the cam track engages a connecting rod, the connecting rod disposed between the spray head and the cam mechanism for causing oscillation of the spray head and nozzle in the vertical plane about the horizontal axis of the spray head and nozzle;

wherein the spray head and nozzle are pivoted at a higher angle above a middle rotational position for a longer period of time as compared to being pivoted at a lower angle below the middle rotational position for a shorter period of time, such that an even water distribution is achieved over a total spray area;

wherein the pop-up riser is not configured to hydraulically oscillate or rotate about the vertical axis within the riser case, wherein the middle rotational position of the spray head and nozzle pivoting about the horizontal axis is defined as halfway between an uppermost angle and a lowermost angle of the pivoting of the spray head and nozzle.

2. The apparatus according to claim 1 wherein said hydraulic motor comprised of the turbine wheel and the gear set rotates the cam mechanism at a rotational speed slower than the turbine wheel.

3. The apparatus according to claim 1 wherein said cam mechanism is configured for oscillating said spray head through an angle of approximately 60 degrees.

4. The apparatus according to claim 1, wherein the amount of time a spray is at a given radius due to the angle of the spray head and nozzle, the amount of time is directly proportional to that given radius.

5. An improved sprinkler apparatus for distributing water from a pressurized water supply line, the apparatus comprising:

a spray head pivotably mounted about a horizontal axis in a pop-up riser, the spray head distributing water in a horizontal plane, the pop-up riser slidably disposed along a vertical axis within a riser case, where the pop-up riser is configured to be in an extended position at least partially above the riser case when pressurized water is flowing through the spray head and in a retracted position when pressurized water is not flowing through the spray head, and wherein the pop-up riser is not configured to hydraulically oscillate or rotate about the vertical axis within the riser case;

a hydraulic motor comprising a hydraulic driven turbine wheel and a gear set disposed within said pop-up riser for causing the spray head to oscillate in a vertical plane about the horizontal axis; and a rotating cam mechanism coupled between the spray head and the hydraulic motor controlling the oscillation in the vertical plane about the horizontal axis of the spray head, wherein the cam mechanism consists of a rotating cam plate having a rotating cam track disposed in an outer circumferential surface of the rotating cam plate, where the cam track engages a connecting rod, the connecting rod disposed between the spray head and the cam mechanism for causing oscillation of the spray head and nozzle in the vertical plane about the horizontal axis of the spray head and nozzle, the rotating cam plate mechanically coupled to the gear set of the hydraulic motor;

wherein the spray head pivoted at a higher angle above a middle rotational position for a longer period of time as compared to being pivoted at a lower angle below the middle rotational position for a shorter period of time, such that an even water distribution is achieved over a total spray area, and wherein the middle rotational position of the spray head and nozzle pivoting about the horizontal axis is defined as halfway between an uppermost angle and a lowermost angle of the pivoting of the spray head and nozzle.

6. The apparatus according to claim 5 wherein said cam mechanism is configured for oscillating said spray head through an angle of 60 degrees.

7. The apparatus according to claim 5, wherein the amount of time a spray is at a given radius due to the angle of the spray head and nozzle, the amount of time is directly proportional to that given radius.

8. A method for evenly distributing water from a pressurized water supply line over a total spray area, said method comprising:

providing a spray head and nozzle pivotable in a vertical plane about a horizontal axis disposed within a pop-up riser, the spread head and nozzle distributing water in a horizontal plane, where the pop-up riser is slidably disposed along a vertical axis within a riser case, where the pop-up riser is configured to be in an extended position at least partially above the riser case when pressurized water is flowing through the spray head and nozzle, and in a retracted position when pressurized water is not flowing through the spray head and nozzle, and wherein the pop-up riser is not configured to hydraulically oscillate or rotate about the vertical axis within the riser case;

utilizing a rotating cam mechanism coupled between the spray head and a turbine wheel and a gear set powered by the pressurized water supply line, wherein the cam mechanism controls the oscillation in the vertical plane of the spray head, wherein the cam mechanism consists of a rotating cam plate having a rotating cam track disposed in an outer circumferential surface of the rotating cam plate, where the cam track engages a connecting rod, the connecting rod disposed between the spray head and the cam mechanism for causing oscillation of the spray head and nozzle in the vertical plane about the horizontal axis of the spray head and nozzle, wherein the rotating cam plate is mechanically coupled to the gear set of the hydraulic motor, where the spray head pivoted at a higher angle above a middle rotational position for a longer period of time as compared to being pivoted at a lower angle below the middle rotational position for a shorter period of time, such that an even water distribution is achieved over the total spray area, wherein the middle rotational position of the spray head and nozzle pivoting about the horizontal axis is defined as halfway between an uppermost angle and a lowermost angle of the pivoting of the spray head and nozzle.

9. The method according to claim 8 wherein the cam mechanism is configured for oscillating said nozzle through an angle of 60 degrees.

10. The method according to claim 8, wherein the amount of time a spray is at a given radius due to the angle of the spray head and nozzle, the amount of time is directly proportional to that given radius.

* * * * *